(12) United States Patent
Oh et al.

(10) Patent No.: US 11,682,808 B2
(45) Date of Patent: *Jun. 20, 2023

(54) POUCH TYPE BATTERY CASE, APPARATUS FOR MOLDING THE SAME, AND POUCH TYPE SECONDARY BATTERY

(71) Applicant: LG Energy Solution, Ltd., Seoul (KR)

(72) Inventors: Se Young Oh, Daejeon (KR); Chung Hee Lee, Daejeon (KR); Jeong Min Ha, Daejeon (KR); Geun Hee Kim, Daejeon (KR); Hyun Beom Kim, Daejeon (KR); Hyung Ho Kwon, Daejeon (KR)

(73) Assignee: LG Energy Solution, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,386

(22) Filed: Oct. 6, 2021

(65) Prior Publication Data

US 2022/0109203 A1 Apr. 7, 2022

(30) Foreign Application Priority Data

Oct. 6, 2020 (KR) .......................... 10-2020-0129025
Jun. 8, 2021 (KR) .......................... 10-2021-0074479

(51) Int. Cl.
| | |
|---|---|
| *H01M 50/105* | (2021.01) |
| *H01M 50/107* | (2021.01) |
| *H01M 50/136* | (2021.01) |
| *B29C 43/02* | (2006.01) |

(Continued)

(52) U.S. Cl.
CPC ......... *H01M 50/105* (2021.01); *B29C 43/021* (2013.01); *H01M 50/107* (2021.01); *H01M 50/133* (2021.01); *H01M 50/136* (2021.01); *B29L 2031/7146* (2013.01)

(58) Field of Classification Search
CPC ............. H01M 50/105; H01M 50/107; H01M 50/136; H01M 50/133; B29C 43/021; B29L 2031/7146
See application file for complete search history.

(56) References Cited

U.S. PATENT DOCUMENTS

| | | | |
|---|---|---|---|
| 2009/0081532 A1* | 3/2009 | Kaplin ................ | H01M 50/538 429/185 |
| 2013/0330606 A1 | 12/2013 | Kwon et al. | |
| 2017/0207483 A1 | 7/2017 | Kim et al. | |

FOREIGN PATENT DOCUMENTS

| | | |
|---|---|---|
| JP | 2002208384 A | 7/2002 |
| JP | 2010232067 A | 10/2010 |
| JP | 2012094374 A | 5/2012 |

(Continued)

OTHER PUBLICATIONS

International Search Report for Application No. PCT/KR2021/013714 dated Jan. 25, 2022, 2 pgs.

*Primary Examiner* — Jane J Rhee
(74) *Attorney, Agent, or Firm* — Lerner David LLP

(57) ABSTRACT

Provided is a pouch type battery case. The pouch type battery case include a cup part configured to accommodate an electrode assembly, which is formed by stacking electrodes and separators, therein and a plurality of die edges configured to connect an outer wall of the cup part to a side extending from the outer wall. At least one die edge includes a first area formed to be rounded with a first curvature radius and a second area formed to be rounded with a second curvature radius less than the first curvature radius.

18 Claims, 13 Drawing Sheets

(51) Int. Cl.
*H01M 50/133* (2021.01)
*B29L 31/00* (2006.01)

(56) References Cited

FOREIGN PATENT DOCUMENTS

| JP | 2015095433 A | | 5/2015 | | |
|----|----|----|----|----|----|
| KR | 20070109080 | * | 11/2007 | ............. | H01M 2/02 |
| KR | 20120014540 A | | 2/2012 | | |
| KR | 101403692 B1 | | 6/2014 | | |
| KR | 20170086346 A | | 7/2017 | | |
| KR | 20170091938 A | | 8/2017 | | |
| KR | 20170124882 A | | 11/2017 | | |
| KR | 20180102927 A | | 9/2018 | | |
| KR | 20190098581 A | | 8/2019 | | |
| KR | 20190115746 A | | 10/2019 | | |
| WO | WO-2018104051 A1 | * | 6/2018 | ............. | B21D 22/20 |

* cited by examiner

[FIG. 1]
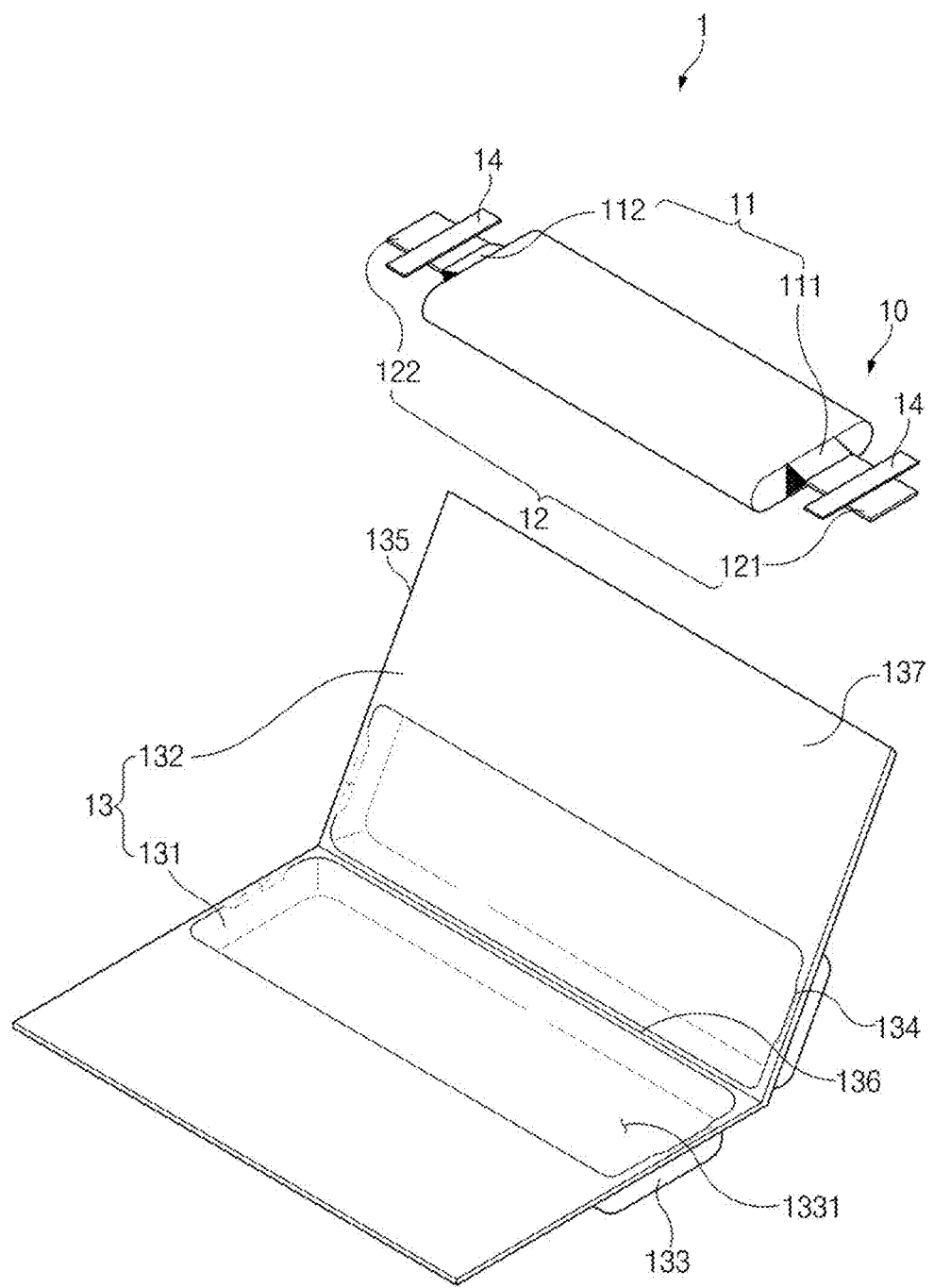

[FIG. 2]
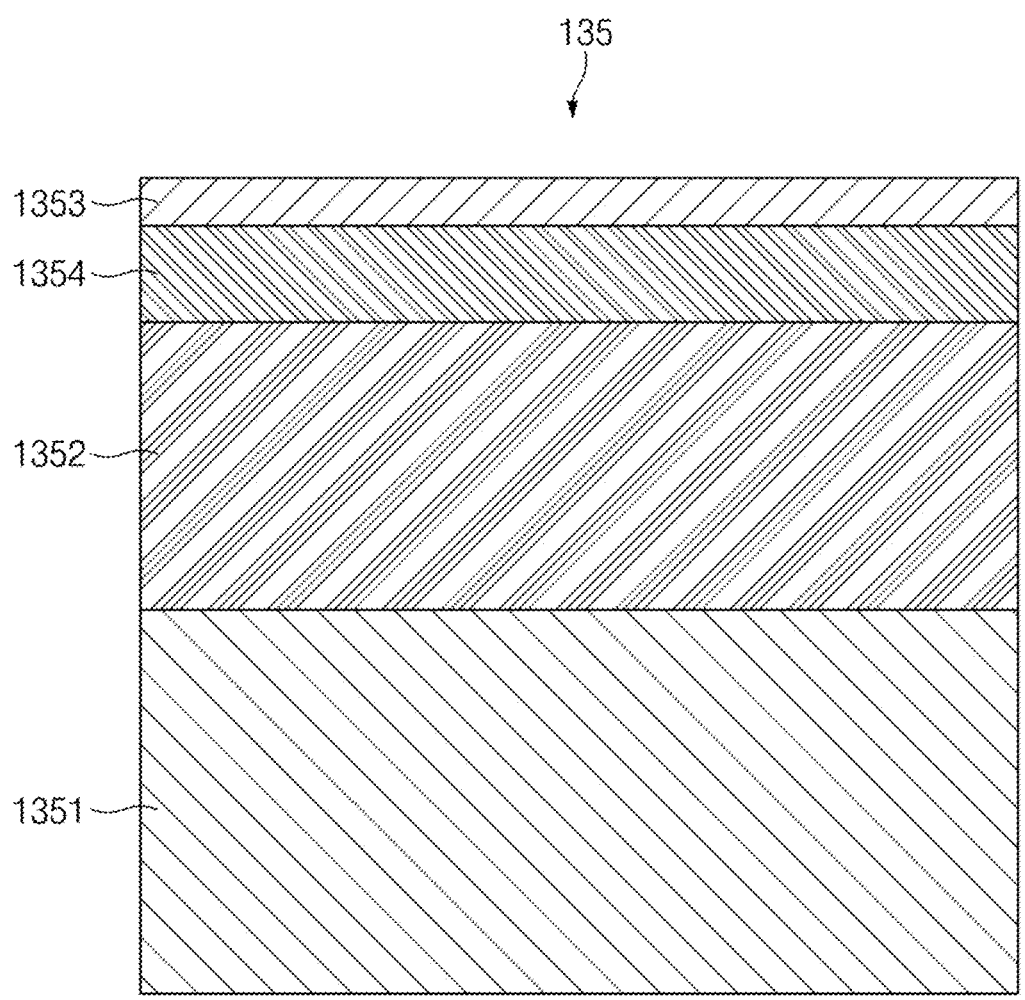

[FIG. 3]
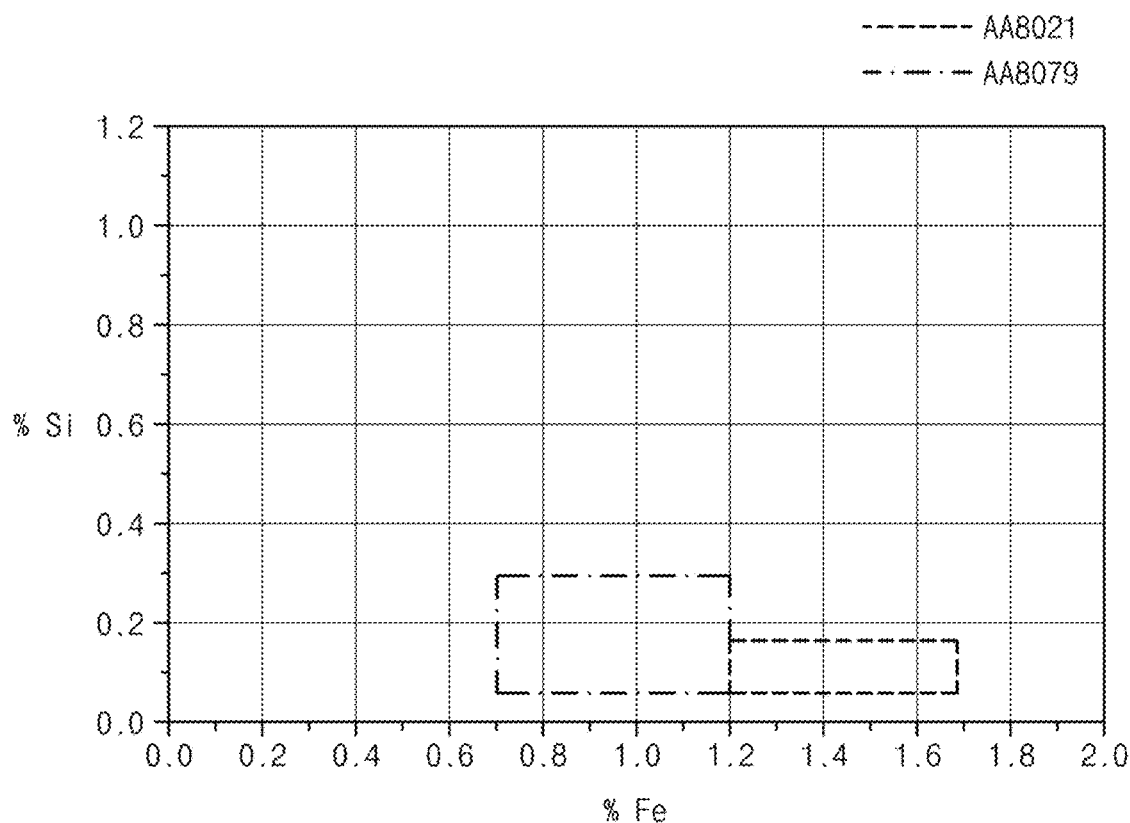

[FIG. 4]
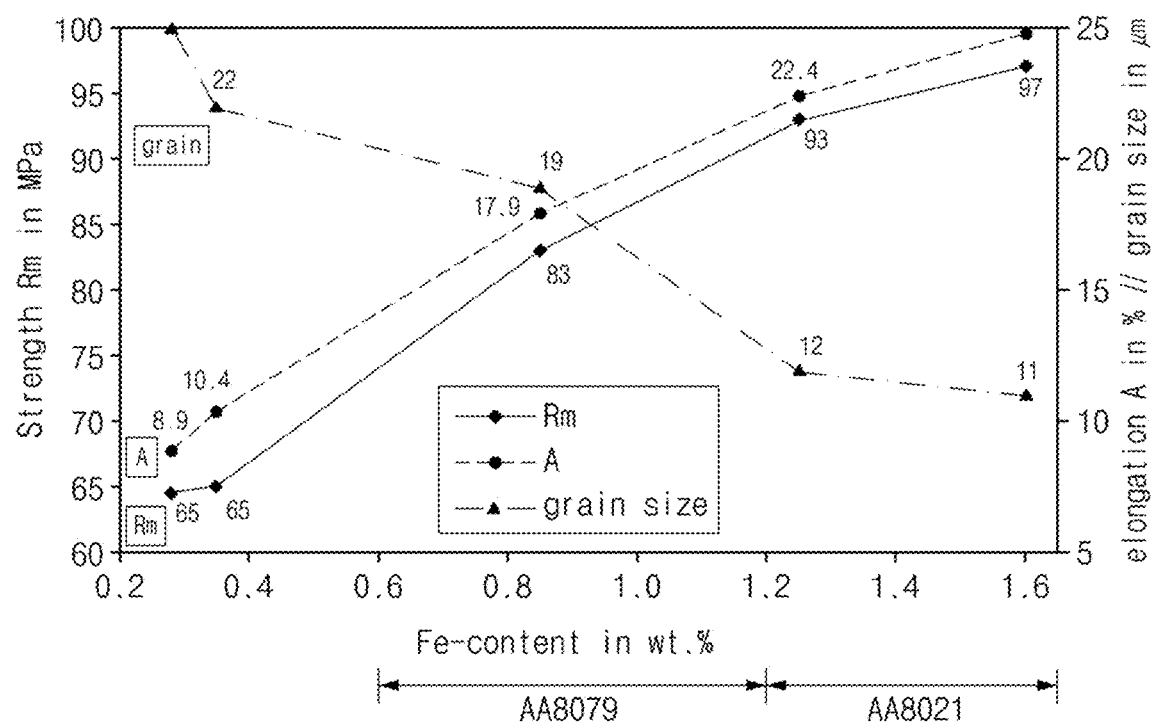

[FIG. 5]
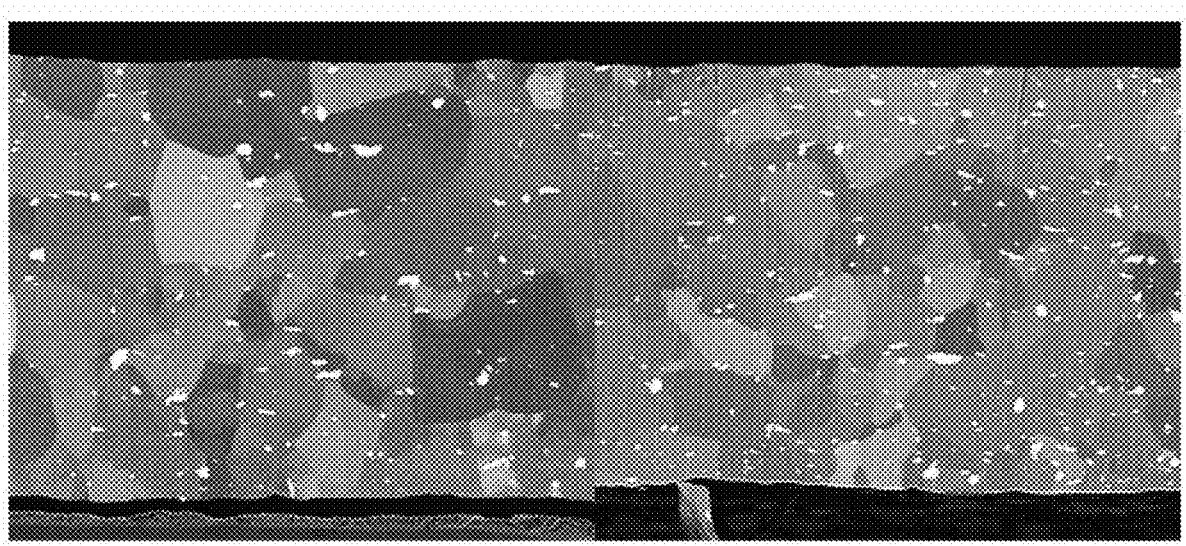

[FIG. 6]
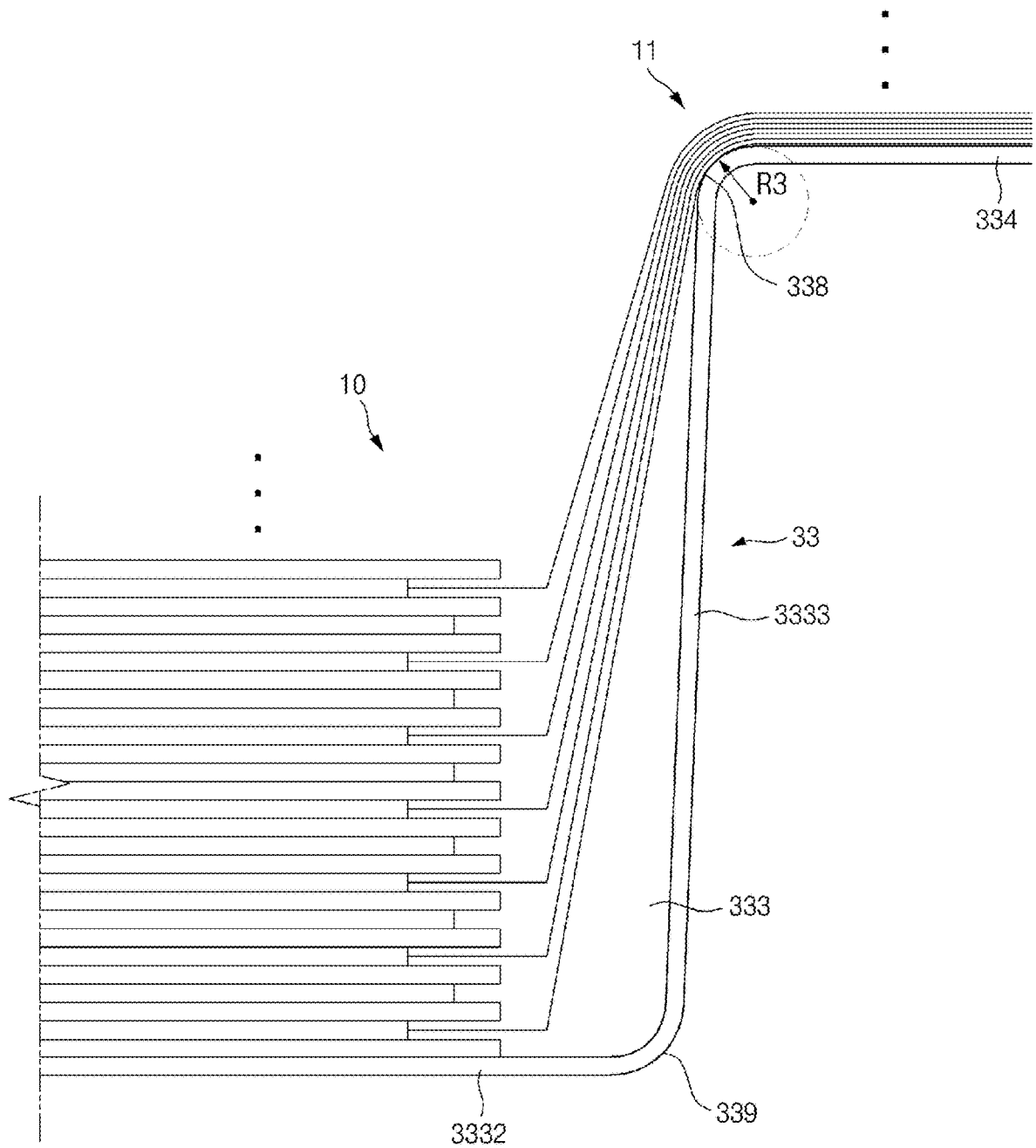

[FIG. 7]
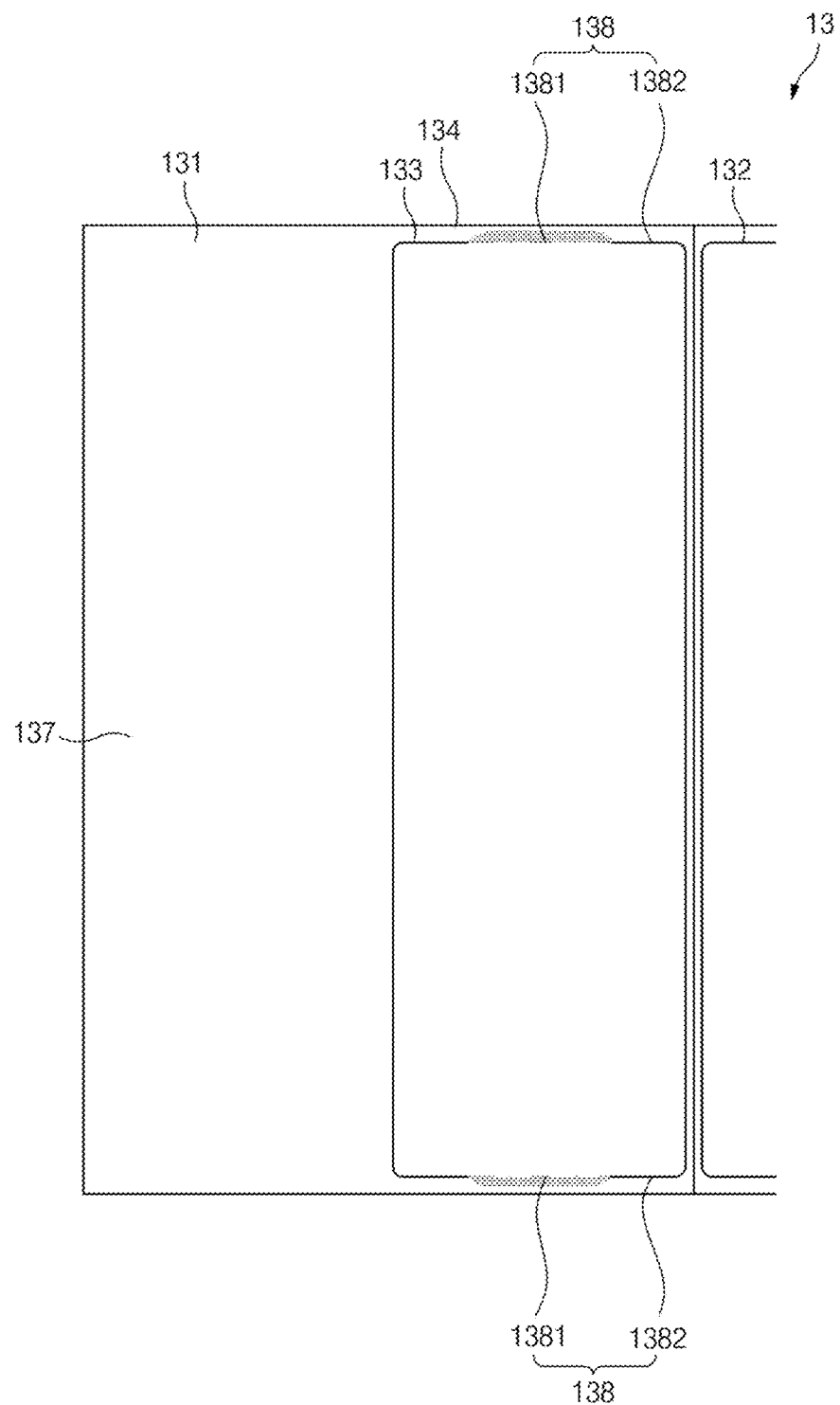

[FIG. 8]
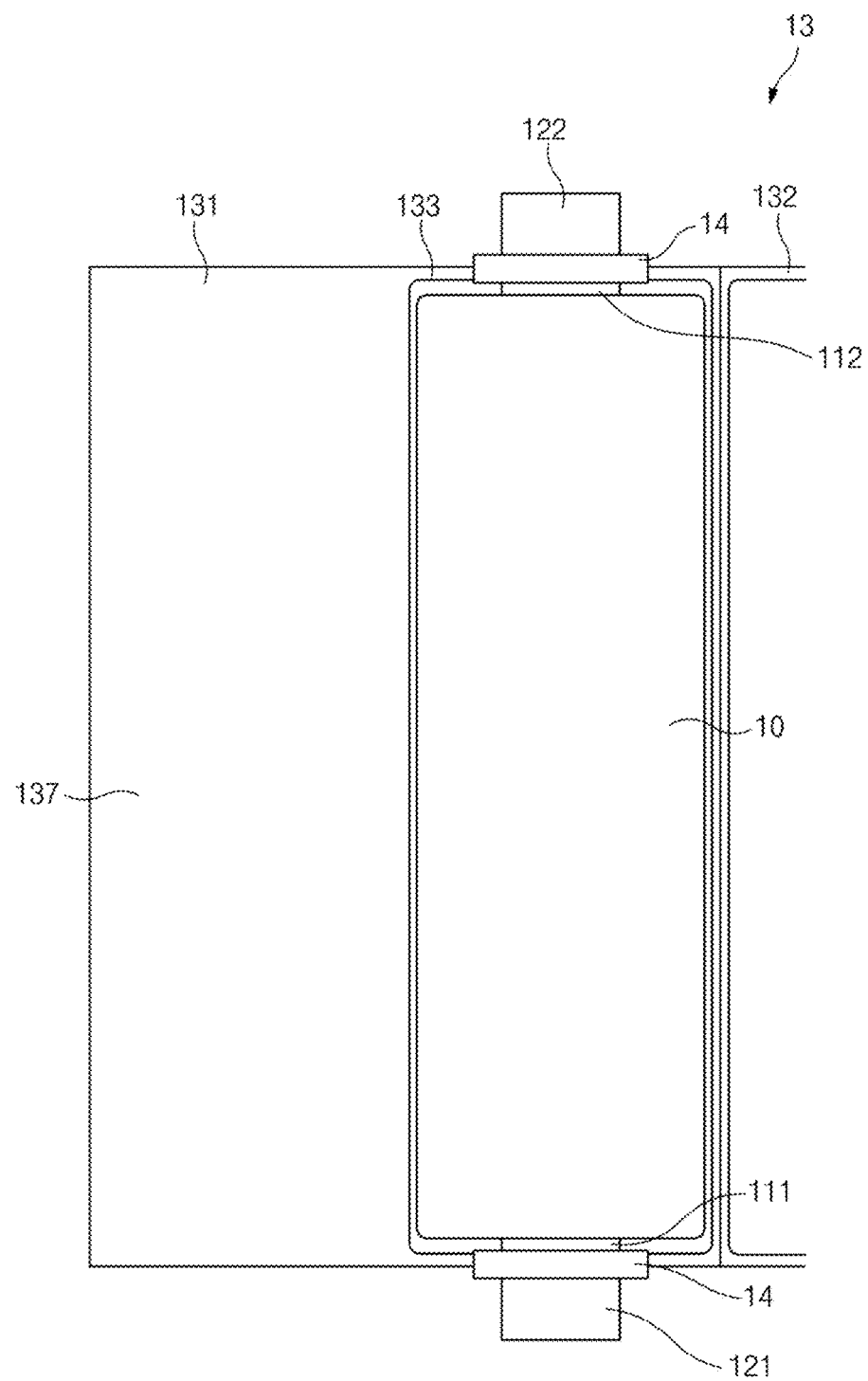

[FIG. 9]
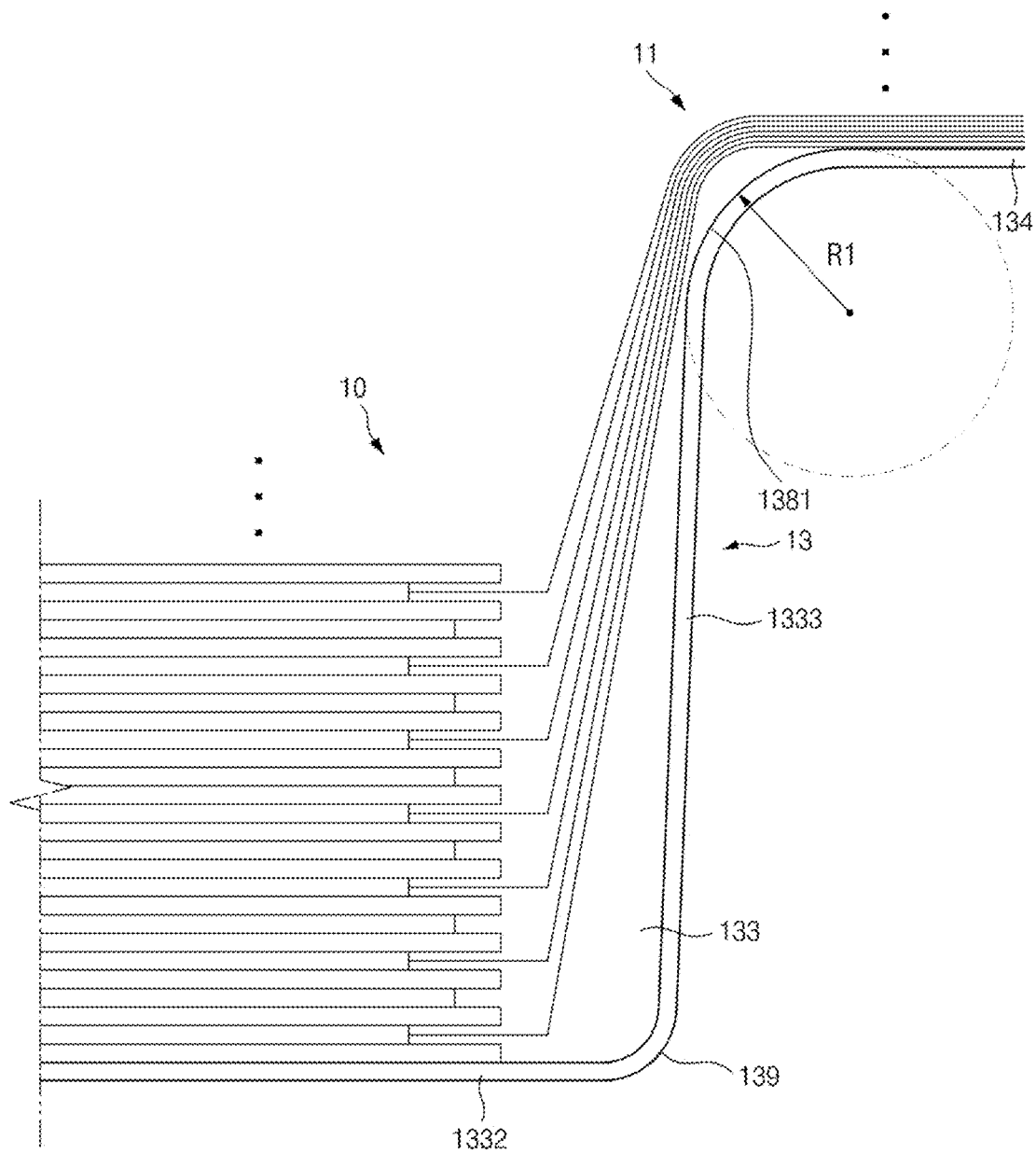

[FIG. 10]
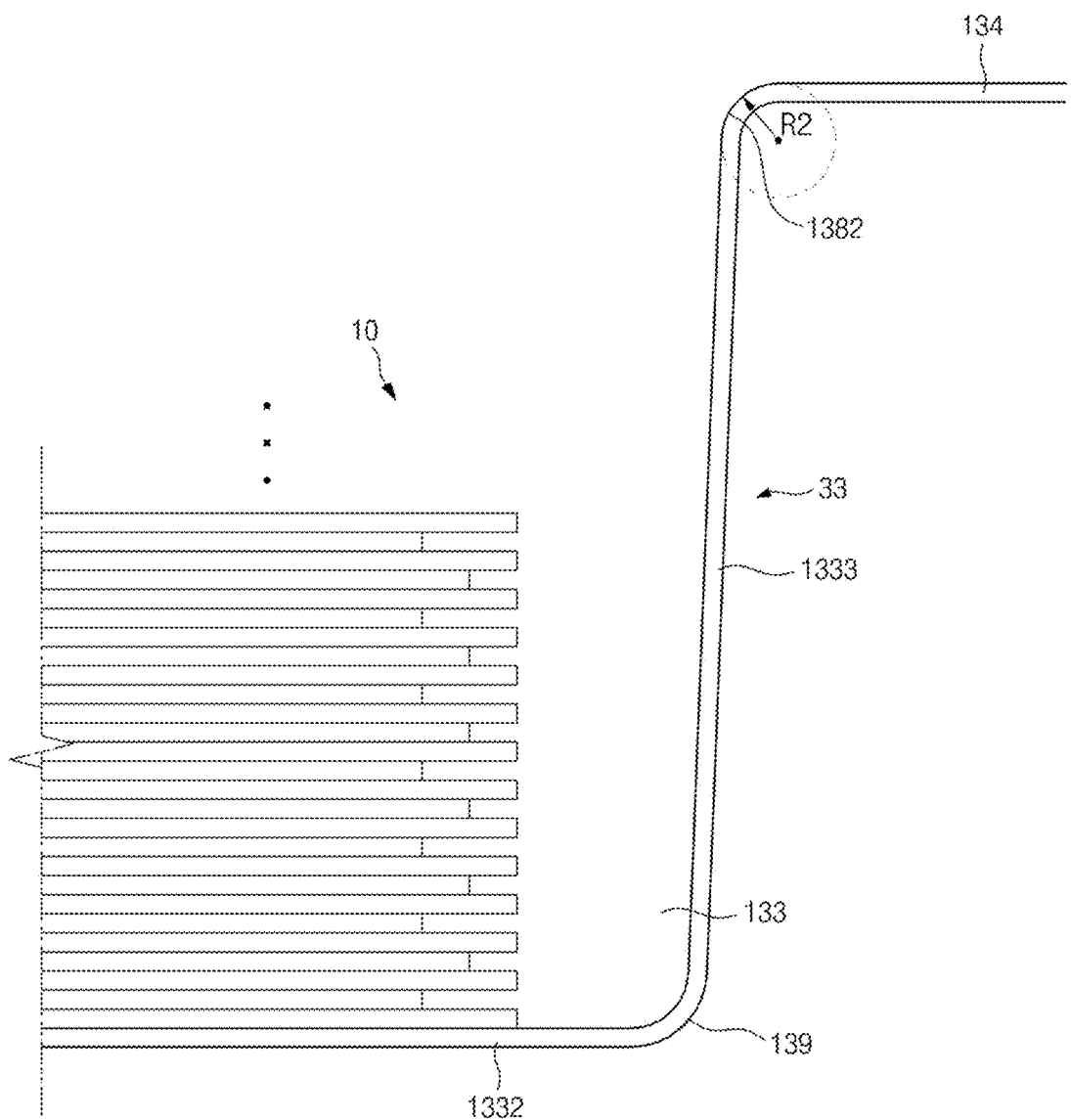

[FIG. 11]
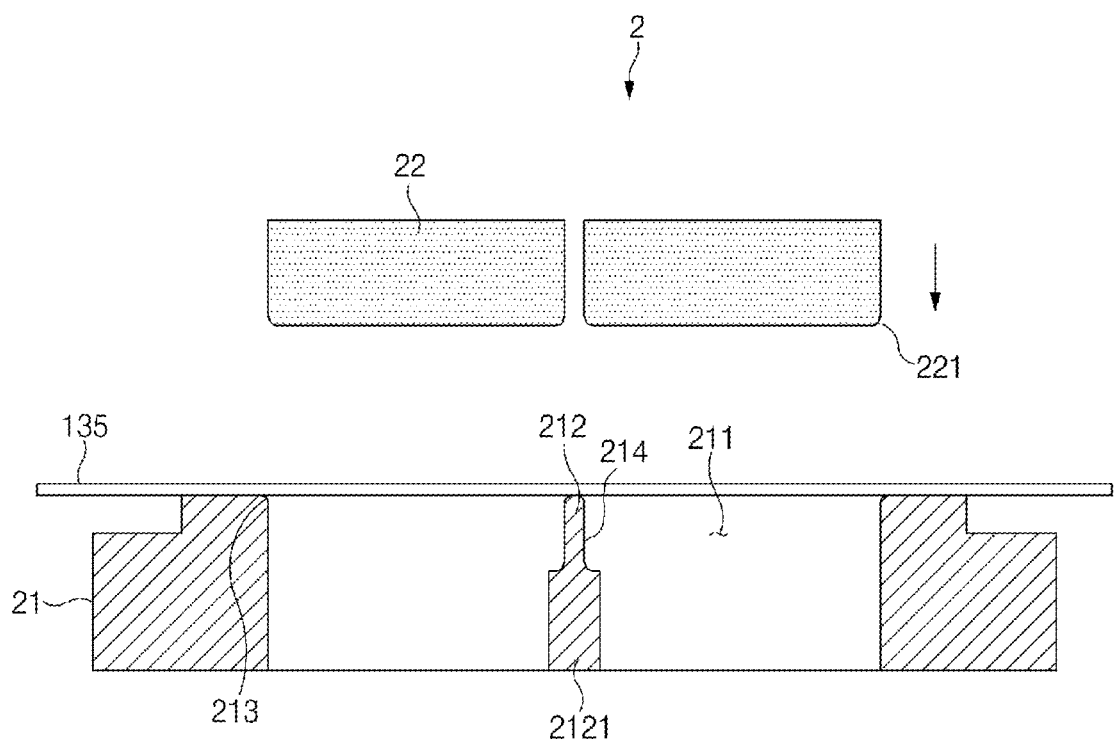

[FIG. 12]
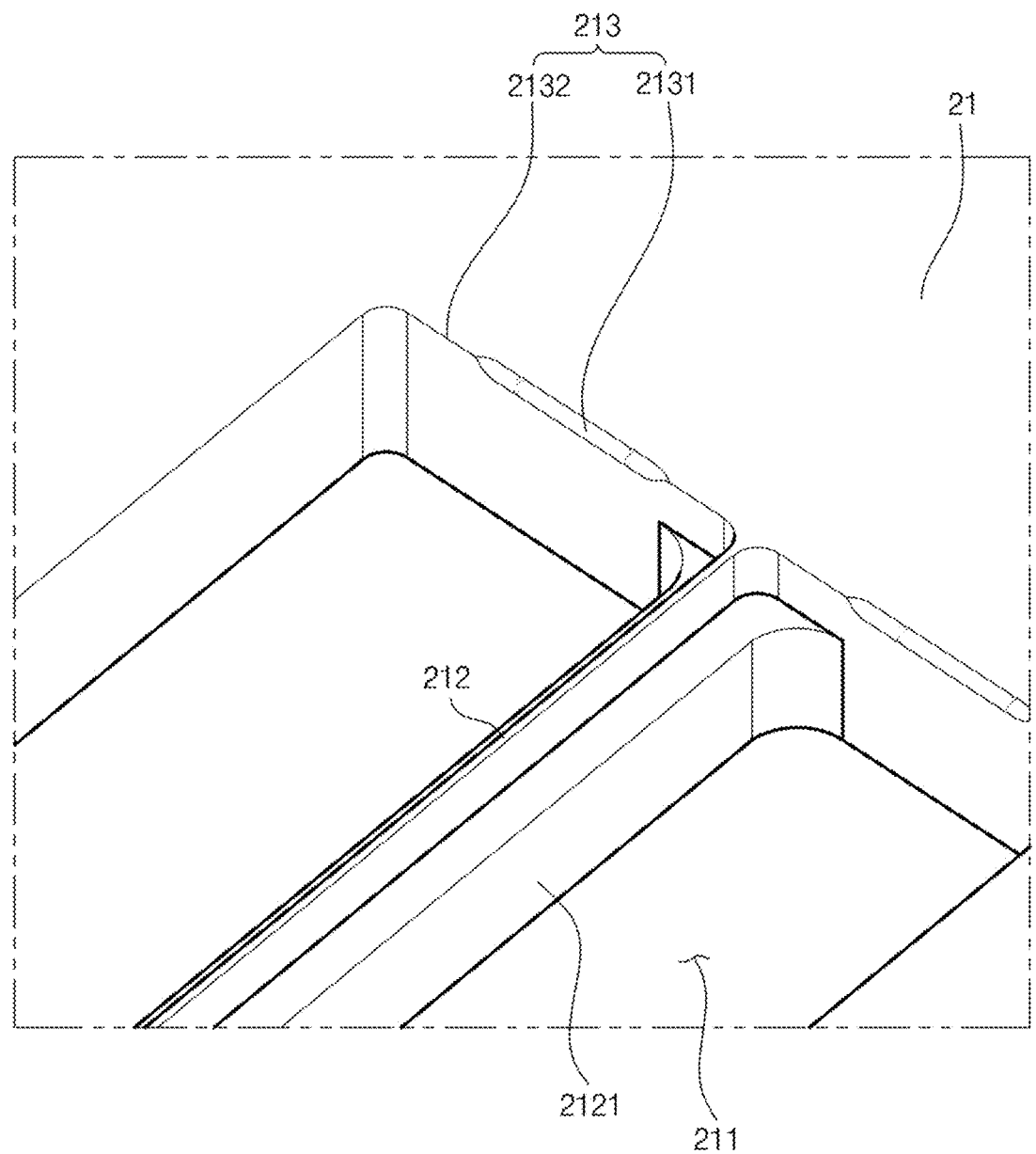

[FIG. 13]
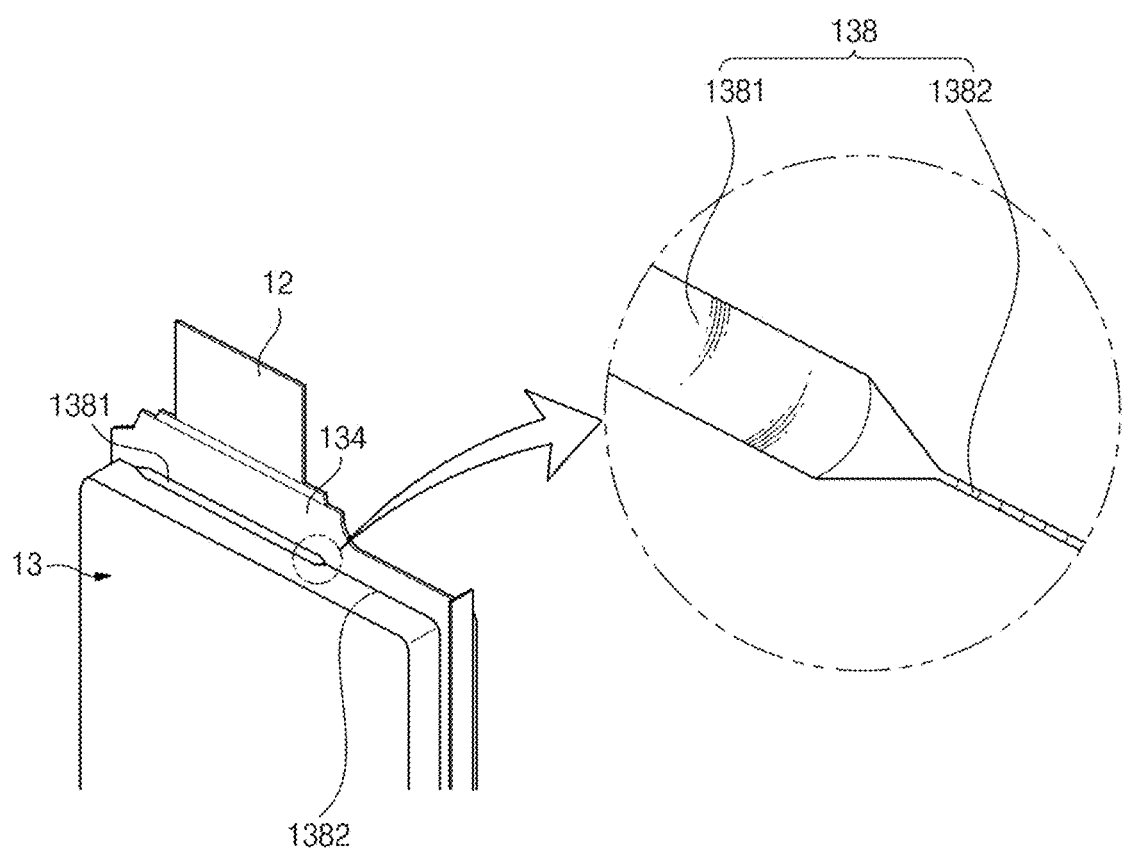

POUCH TYPE BATTERY CASE, APPARATUS FOR MOLDING THE SAME, AND POUCH TYPE SECONDARY BATTERY

CROSS-REFERENCE TO RELATED APPLICATIONS

This application claims the priority of Korean Patent Application No. 10-2020-0129025 filed on Oct. 6, 2020 and Korean Patent Application No. 10-2021-0074479 filed on Jun. 8, 2021, in the Korean Intellectual Property Office, the disclosures of which are each incorporated herein by reference.

BACKGROUND OF THE INVENTION

Field of the Invention

The present invention relates to a pouch type battery case and an apparatus for molding the same, and a pouch type secondary battery, and more particularly, to a pouch type battery case, which is capable of preventing an interference between a die edge and an electrode tab from occurring, an apparatus for molding the same, and a pouch type secondary battery.

Description of the Related Art

In general, secondary batteries include nickel-cadmium batteries, nickel-hydrogen batteries, lithium ion batteries, and lithium ion polymer batteries. Such a secondary battery is used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the secondary battery, first, electrode active material slurry is applied to a positive electrode collector and a negative electrode collector to manufacture a positive electrode and a negative electrode. Then, the electrodes are stacked on both sides of a separator to form an electrode assembly. Also, the electrode assembly is accommodated in a battery case, and then the battery case is sealed after an electrolyte is injected therein.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. On the other hand, in the can type secondary battery, an electrode assembly is accommodated in a case made of a metal or plastic material.

A pouch, which is a case of the pouch type secondary battery, is manufactured by forming a cup part by performing press processing on a pouch film having flexibility. In addition, when the cup part is formed, an electrode assembly is accommodated in an accommodation space of the cup part, and then, a side of the cup part is sealed to manufacture a secondary battery.

In the press processing, drawing molding is performed by inserting a pouch film into a molding device such as a press equipment and applying a pressure to the pouch film by using a punch to draw the pouch film. The pouch film is provided as a plurality of layers, and a moisture barrier layer disposed in the pouch film is made of a metal. However, if the moisture barrier layer has improved moldability such that a wall of the cup part is close to a vertical state, thereby improving a curvature radius of the edge of the cup part is improved, then there is a problem that the die edge presses the electrode tabs and causes an interference between the die edge and the electrode tabs.

PRIOR ART DOCUMENT

Patent Document (Patent Document 1) Korea Patent Publication No. 2017-0124882

SUMMARY OF THE INVENTION

An aspect of the present invention provides a pouch type battery case, which is capable of preventing an interference between a die edge and an electrode tab from occurring, an apparatus for molding the same, and a pouch type secondary battery.

The objects of the present invention are not limited to the aforementioned object, but other objects not described herein will be clearly understood by those skilled in the art from descriptions below.

According to an aspect of the present invention, there is provided a pouch type battery case including: a pouch film defining a first cup part configured to accommodate an electrode assembly therein, a side at least partially surrounding the first cup part, and at least one die edge arranged at a junction of the side and a wall of the first cup part, wherein the at least one die edge includes a first rounded area defining a first curvature radius and a second rounded area defining a second curvature radius less than the first curvature radius.

The first curvature radius may be between about 1.7 mm and about 2.7 mm.

The second curvature radius may be approximately equal to or less than 1.2 mm.

The second curvature radius may be approximately equal to or less than 0.7 mm.

The pouch film may be molded and may include: a sealant layer made of a first polymer and formed at the innermost layer with a thickness of between about 60 μm and about 100 μm; a surface protection layer made of a second polymer and formed at the outermost layer; and a moisture barrier layer provided between the surface protection layer and the sealant layer, wherein the moisture barrier layer may include an aluminum alloy thin film having a thickness between about 50 μm and about 80 μm and a grain size of between about 10 μm and about 13 μm.

A specific depth of the first cup measured from a bottom of the first cup to the side may be about 7 mm.

A pouch type battery case may further include a second cup part and the depths of the first and second cup measured from a bottom of the first and second cup parts, respectively, to the side may be about 6.5 mm.

The at least one die edge may include two die edges formed on opposite sides of the first cup part.

Each one of the two die edges may include a single one of the first rounded areas.

Each one of the two die edges may include two of the second rounded areas.

The first rounded area may be formed between the two second rounded areas on each respective die edge.

The at least one die edge may include one die edge formed on one side of the first cup part, and the one die edge may include a plurality of the first rounded areas and the second rounded area may be formed between the plurality of the first rounded areas.

According to another aspect of the present invention, an apparatus for molding a battery case is provided. The apparatus includes: a die including a top surface on which a pouch film is configured to be and which includes at least one molding space recessed inwardly from the top surface, and a punch disposed above the molding space and arranged to descend into the molding space to mold the pouch film. The die defines at least one pressing edge at a junction between the top surface and a sidewall of the at least one molding space. The at least one pressing edge includes a first rounded pressing area formed with a first radius of curvature and a second rounded pressing area formed with a second radius of curvature that is less than the first radius of curvature.

The first radius of curvature may be between about 1.5 mm and about 2.5 mm.

The fourth curvature radius may be approximately equal to or less than 1 mm.

According to yet another aspect of the present invention, a pouch type secondary battery is provided. The pouch type second battery includes an electrode assembly formed by stacking electrodes and separators; and a battery case including a pouch film defining a first cup part accommodating the electrode assembly therein, side at least partially surrounding the first cup part, and a plurality of die edges each of which are arranged at a junction of the die and a wall of the first cup part. At least one of the plurality of die edges includes a first area defining a first inward concave recess arranged to receive an electrode tab protruding from one side of the electrode assembly.

The at least one die edge may further include a second area adjacent to the first area and be formed with a second inward concave recess that is less concave than the first inward concave recess.

The first area may be rounded and define a first radius of curvature, and the second area may be rounded and define a second radius of curvature radius that is less than the first radius of curvature.

The electrode assembly may have a surface area of between about 15,000 mm² and about 100,000 mm².

The electrode tab protruding from the one side of the electrode assembly may be seated on the first area.

Other particularities of the embodiments are included in the detailed description and drawings.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is an assembled view of a secondary battery according to an embodiment of the present invention;

FIG. 2 is a cross-sectional view of a pouch film according to an embodiment of the present invention;

FIG. 3 is a graph illustrating iron and silicon contents of an aluminum alloy having an alloy number AA8079 and an aluminum alloy having an alloy number AA8021;

FIG. 4 is a graph illustrating changes in tensile strength (Rm), drawing rate, and grain size according to the iron content of the aluminum alloy having the alloy number AA8079 and the aluminum alloy having the alloy number AA8021;

FIG. 5 is an enlarged SEM image of grains of the aluminum alloy having the alloy number AA8079 and the aluminum alloy having the alloy number AA8021;

FIG. 6 is an enlarged schematic view of a die edge and an electrode tab according to Comparative Example of the present invention;

FIG. 7 is a partial plan view of a battery case according to an embodiment of the present invention;

FIG. 8 is a partial plan view illustrating a state in which an electrode assembly is inserted into a cup part of the battery case according to an embodiment of the present invention;

FIG. 9 is an enlarged schematic view of a first area of the die edge and the electrode tab according to an embodiment of the present invention;

FIG. 10 is an enlarged schematic view of a second area of the die edge of the cup part and the electrode tab according to an embodiment of the present invention;

FIG. 11 is a schematic view of a molding apparatus according to an embodiment of the present invention;

FIG. 12 is a partial enlarged view of a die according to an embodiment of the present invention; and FIG. 13 is a partial perspective view of a secondary battery according to another embodiment of the present invention.

DETAILED DESCRIPTION OF THE PREFERRED EMBODIMENT

Advantages and features of the present invention, and implementation methods thereof will be clarified through the following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "includes (comprises)" and/or "including (comprising)" does not exclude other components besides a mentioned component. Also as used herein, the terms "substantially," "generally," "approximately," and "about" are intended to mean that slight deviation from absolute are included within the scope of the term so modified.

Hereinafter, preferred embodiments will be described in detail with reference to the accompanying drawings.

FIG. 1 is an assembled view of a secondary battery 1 according to an embodiment of the present invention.

According to an embodiment of the present invention, as tensile strength and a drawing rate of a pouch film 135 are improved, toughness increases to improve moldability when the pouch film 135 is molded to manufacture a pouch type battery case 13.

With additional reference to FIG. 2, the pouch film 135 includes a sealant layer 1351 made of a first polymer and formed at the innermost layer; a surface protection layer 1353 made of a second polymer and formed at the outermost layer; and a moisture (or gas) barrier layer 1352 stacked between the surface protection layer 1353 and the sealant layer 1351. The moisture barrier layer 1352 may be formed as an aluminum alloy thin film having a thickness of 50 μm to 80 μm and a grain size of 10 μm to 13 μm, and the sealant layer 1351 may have a thickness of 60 μm to 100 μm. Particularly, the moisture barrier layer 1352 may have a thickness of 55 μm to 65 μm, and the sealant layer 1351 may have a thickness of 75 μm to 85 μm.

An electrode assembly 10 is formed by alternately stacking electrodes and separators. First, a slurry in which an electrode active material, a binder, and a plasticizer are mixed with each other, is applied to a positive electrode collector and a negative electrode collector to manufacture the a positive electrode and a negative electrode (collectively "electrodes"). Then, respective separators are stacked between the electrodes to form the electrode assembly 10. The electrode assembly 10 is then inserted into the battery case 13, and an electrolyte is injected into the battery case 13.

The electrode assembly 10 may have a surface area of 15,000 mm$^2$ to 100,000 mm$^2$, which is obtained by multiplying a full length by a full width. In particular, the full width of the electrode assembly 10 may be 60 mm or more. Also, the electrode assembly 10 may have a thickness of 6 mm to 20 mm in a stacked direction. Therefore, the electrode assembly 10 may provide a large battery capacity when compared to a generally small-sized battery.

Particularly, the electrode assembly 10 includes two types of electrodes such as the positive electrode and the negative electrode and the separator interposed between the electrodes to insulate the electrodes from each other. The electrode assembly 10 may be a stack type, a jelly roll type, a stacked and folding type, or the like. Each of the two types of electrodes, i.e., the positive electrode and the negative electrode has a structure in which active material slurry is applied to the electrode collector having a metal foil or metal mesh shape. The active material slurry may be formed by agitating a granular active material, a conductor, and the like in a state of adding a solvent. The solvent may be removed in the subsequent process.

As illustrated in FIG. 1, the electrode assembly 10 includes electrode tabs 11. The electrode tabs 11 are respectively connected to a positive electrode and a negative electrode of the electrode assembly 10 to protrude outward from the electrode assembly 10, thereby providing a path, through which electrons are moved, between the inside and outside of the electrode assembly 10. An electrode collector of the electrode assembly 10 is constituted by a portion coated with an electrode active material and a distal end, on which the electrode active material is not applied, i.e., a non-coating part. Also, each of an electrode tabs 11 may be formed by cutting the non-coating part or by connecting a separate conductive member to the non-coating part through ultrasonic welding. As illustrated in FIG. 1, the electrode tabs 11 may protrude in opposite directions of the electrode assembly 10, but the invention is not limited thereto. For example, the electrode tabs may protrude in any other direction, for example, protrude in the same direction and in parallel to each other from one side of the electrode assembly 10.

In the electrode assembly 10, an electrode lead 12 that supplies electricity to the outside of the secondary battery 1 is connected to the electrode tab 11 through spot welding. Also, a portion of the electrode lead 12 is surrounded by an insulating part 14. The insulating part 14 may be disposed to be limited to a side 134, at which a first case 131 and a second case 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulating part 14 may be made of a nonconductor having non-conductivity, which is not electrically conductive. In general, although an insulation tape which is easily attached to the electrode lead 12 and has a relatively thin thickness is mainly used as the insulating part 14, the present invention is not limited thereto. For example, various members may be used as the insulating part 14 as long as the members are capable of insulating the electrode lead 12.

One end of the electrode lead 12 is connected to the electrode tab 11, and the other end of the electrode lead 12 protrudes to the outside of the battery case 13. That is, the electrode lead 12 includes a cathode lead 121 having one end connected to a cathode tab 111 to extend in a direction in which the cathode tab 111 protrudes and an anode lead 122 having one end connected to an anode tab 112 to extend in a direction in which the anode tab 112 protrudes. On the other hand, as illustrated in FIG. 1, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other. That is, the cathode lead 121 may be made of the same material as the cathode collector, i.e., an aluminum (Al) material, and the anode lead 122 may be made of the same material as the anode collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch, which is manufactured by molding a flexible material and accommodates the electrode assembly 10 therein. Hereinafter, the case in which the battery case 13 is the pouch will be described. When a pouch film 135 having flexibility is drawing-molded using a punch 22 (see FIG. 11) or the like, a portion of the pouch film 135 is drawn to form the cup part 133 including a pocket-shaped accommodation space 1331, thereby manufacturing the battery case 13.

The battery case 13 accommodates the electrode assembly 10 so that a portion of the electrode lead 12 is exposed and then is sealed. As illustrated in FIG. 1, the battery case 13 includes the first case 131 and the second case 132. The accommodation space 1331 in which the cup part 133 is formed to accommodate the electrode assembly 10 may be provided in the first case 131, and the second case 132 may cover an upper side of the accommodation space 1331 so that the electrode assembly 10 is not separated to the outside of the battery case 13. As illustrated in FIG. 1, one side of the first case 131 and one side of the second case 132 may be connected to each other. However, the present invention is not limited thereto. For example, the first case 131 and the second case 132 may be separately manufactured to be separated from each other.

When the cup part 133 is molded in the pouch film 135, only one cup part 133 may be formed in one pouch film 135, but the present invention is not limited thereto. For example, two cup parts may be drawing-molded to be adjacent to each other in one pouch film 135. Then, as illustrated in FIG. 1, the cup parts 133 are formed in the first case 131 and the second case 132, respectively. Here, each of the cup parts 133, which are respectively formed in the first case 131 and the second case 132, may have the same depth D, but is not limited thereto, and may have different depths D.

According to an embodiment of the present invention, the depth D of the cup part 133 may be 3 mm or more, in particular, 6.5 mm or more. Therefore, the cup part 133 according to an embodiment of the present invention may accommodate the electrode assembly 10 having a larger electrode capacity compared to a general small-sized battery.

After accommodating the electrode assembly 10 in the accommodation space 1331 provided in the cup part 133 of the first case 131, the battery case 13 may be folded with respect to a bridge 136 formed between the two cup parts 133 in the battery case 13 so that the two cup parts 133 face each other. Then, the cup part 133 of the second case 132 also accommodates the electrode assembly 10 from the upper side thereof. Accordingly, since the two cup parts 133 accommodate one electrode assembly 10, an electrode assembly having a thicker thickness, such as electrode assembly 10, may be accommodated therein compared to a case in which only one cup part 133 is provided. In addition, since the first case 131 and the second case 132 are integrally connected to each other by folding the battery case 13, the number of sides 134 to be sealed when a sealing process is later performed is reduced. Thus, a process rate may be improved, and the number of sealing processes may be reduced.

The battery case 13 may include the cup part 133, in which the accommodation space 1331 accommodating the electrode assembly 10 is provided, and a degassing part 137 formed at a side portion of the cup part 133 to discharge a gas generated in the cup part 133 through a degassing hole. When the electrode assembly 10 is accommodated in the cup part 133 of the battery case 13, and the electrolyte is injected, and then an activation process is performed, a gas is generated inside the battery case 13, and thus, a degassing process for discharging the gas to the outside is performed.

The pouch type secondary battery 1 may be manufactured as described below. First, the electrode lead 12 is connected to the electrode tab 11 of the electrode assembly 10, and the insulating part 14 is formed on a portion of the electrode lead 12. The electrode assembly 10 is then accommodated in the accommodation space 1331 provided in the cup part 133 of the first case 131, and the second case 132 is used to cover the accommodation space from the upper side. Next, the electrolyte is injected into the accommodation space, and the side 134 extending to the outside of the cup part 133 of each of the first case 131 and the second case 132 is then sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. Furthermore, the electrolyte may include a sulfide-based, oxide-based, or polymer-based solid electrolyte, and the solid electrolyte may have flexibility that is easily deformed by external force.

FIG. 2 is a cross-sectional view of a pouch film 135 according to an embodiment of the present invention.

The pouch that is the battery case 13 of the pouch type secondary battery 1 according to an embodiment of the present invention may be manufactured by drawing the pouch film 135. That is, the pouch film 135 is drawn by using the punch 22 (FIG. 11) or the like to form the cup part 133, thereby manufacturing the battery case 13. According to an embodiment of the present invention, as illustrated in FIG. 2, the pouch film 135 may include the sealant layer 1351, the moisture barrier layer 1352, and the surface protection layer 1353, and optionally include a drawing assistance layer 1354 if desired.

The sealant layer 1351 may be made of the first polymer and be formed at the innermost layer to be in direct contact with the electrode assembly 10. Here, the innermost layer represents a layer disposed at the last when oriented in a direction opposite to the direction in which the electrode assembly 10 is disposed with respect to the moisture barrier layer 1352. The battery case 13 may be manufactured while a portion of the pouch film 135 is drawn to form the cup part 133 including the accommodation space 1331 having the pocket shape when the pouch film 135 having the stacked structure as described above is drawing-molded by using the punch 22 or the like. Also, when the electrode assembly 10 is accommodated in the accommodation space 1331, the electrolyte is injected. Thereafter, when the first case 131 and the second case 132 are in contact with each other so as to face each other, and thermal compression is applied to the side 134, the sealant layers 1351 are bonded to each other to seal the pouch. Here, since the sealant layer 1351 is in direct contact with the electrode assembly 10, the sealant layer 1351 has to have insulating properties. Also, since the sealant layer 1351 is in contact with the electrolyte, the sealant layer 1351 has to have corrosion resistance. Also, since the inside of the battery case 13 is completely sealed to prevent materials from moving between the inside and outside of the battery case 13, high sealability has to be realized. That is, the side 134 in which the sealant layers 1351 are bonded to each other should have superior thermal bonding strength. In general, the first polymer forming the sealant layer 1351 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polyolefin-based resin such as polypropylene (PP) or polyethylene (PE) is used for the sealant layer 23. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1351. Furthermore, the sealant layer 23 may be made of a casted polypropylene, an acid modified polypropylene, or a polypropylene-butylene-ethylene terpolymer. Here, the acid-treated polypropylene may be maleic anhydride polypropylene (MAH PP). Also, the sealant layer 1351 may have a single layer structure made of one material or a composite layer structure in which two or more materials are respectively formed as layers.

According to an embodiment of the present invention, the sealant layer 1351 may have a thickness of 60 μm to 100 μm, and in particular, a thickness of 75 μm to 85 μm. If the sealant layer 1351 has a thickness less than 60 μm, the sealant layer 1351 may be deteriorated in durability, for example, the inside may be broken during the sealing. Conversely, if the sealant layer has a thickness greater than 100 μm, the total thickness of the pouch is excessively thick, and rather, the moldability may be deteriorated, or an energy density relative to a volume of the secondary battery may be reduced. When the thickness of the sealant layer 1351 is thin, an insulation breakdown voltage of the pouch film 135 may be lowered, and thus the insulation may be deteriorated. When the battery is manufactured using the pouch film 135 having the poor insulation, a defect rate may increase.

The moisture barrier layer 1352 is stacked between the surface protection layer 1353 and the sealant layer 1351 to secure mechanical strength of the pouch, block introduction and discharge gas and moisture outside the secondary battery 1, and prevent the electrolyte from leaking. The moisture barrier layer 1352 may be made of an aluminum alloy thin film. The aluminum alloy thin film may secure the mechanical strength having a predetermined level or more, but be light in weight. Thus, the aluminum alloy thin film has electrochemical properties to secure heat dissipation due to the electrode assembly 10 and the electrolyte.

More specifically, the aluminum alloy thin film according to an embodiment of the present invention may have a grain size of 10 μm to 13 μm, preferably 10.5 μm to 12.5 μm, and more preferably 11 μm to 12 μm. When the grain size of the aluminum alloy thin film satisfies the above range, the molding depth may increase without causing pinholes or cracks when the cup is molded.

The aluminum alloy thin film may include one or two kinds or more selected from the group consisting of iron (Fe), copper (Cu), chromium (Cr), manganese (Mn), nickel (Ni), magnesium (Mg), and zinc (Zn) in addition to aluminum.

In addition, according to an embodiment of the present invention, the moisture barrier layer 1352 may have a thickness of 50 μm to 80 μm, in particular, 55 μm to 65 μm.

According to the related art, the moisture barrier layer has a thickness less than 50 μm to deteriorate the moldability. Thus, when the pouch film 135 is drawing-molded, there is a limitation in forming the wall of the cup part, which is close to the vertical state when the cup part is formed to have a deep depth, and there is a limitation in reducing the curvature radius of the edge of the cup part. In addition, when the battery case undergoes an impact from the outside, the internal electrode assembly may be easily damaged due to the weak puncture strength.

Conversely, if the moisture barrier layer has a thickness greater than about 80 μm, not only does the manufacturing cost increase, but also the total thickness of the secondary battery is excessively thick which deteriorates the energy density relative to the volume of the secondary battery. If the thickness of the sealant layer is reduced to be thinner than 60 μm in order to reduce the total thickness of the secondary battery, sealing durability may be deteriorated.

However, when only the thickness of the aluminum alloy thin film increases, the molding depth may increase, but then pinholes or cracks may be generated in the aluminum alloy thin film after the molding to deteriorate the sealing durability.

As a result of repeated research by the present inventors, when the aluminum alloy thin film having a specific grain size is applied as the material of the moisture barrier layer, and the thickness of each of the moisture barrier layer and the sealant layer is controlled within a specific range, it is found that the cup part is molded deeply, and the sealing durability is also excellently maintained. Therefore, the present invention has been implemented.

Particularly, the moisture barrier layer 1352 according to the present invention includes an aluminum alloy thin film having a grain size of 10 μm to 13 μm, preferably 10.5 μm to 12.5 μm, and more preferably 11 μm to 12 μm. When the grain size of the aluminum alloy thin film satisfies the above range, the molding depth may increase without causing the pinholes or cracks when the cup is molded. When the grain size of the aluminum alloy thin film exceeds 13 μm, the strength of the aluminum alloy thin film decreases, and the generation of the cracks or pinholes increases due to difficulty in dispersing internal stress during the drawing. When the grain size is less than 10 μm, the flexibility of the aluminum alloy thin film is lowered, and there is a limitation in improving the moldability.

The grain size varies depending on a composition of the aluminum alloy thin film and a processing method of the aluminum alloy thin film. Here, a cross-section in thickness direction of the aluminum alloy thin film may be observed and measured using a scanning electron microscope (SEM). Particularly, in the present invention, the cross-section in the thickness direction of the aluminum alloy thin film may be acquired using the scanning electron microscope, and then, maximum diameters of the predetermined number of grains among the grains observed through an SEM image may be measured to evaluate a mean value of the maximum diameters as the grain size.

The surface protection layer 1353 is made of the second polymer and formed at the outermost layer to protect the secondary battery 1 against external friction and collision and also electrically insulates the electrode assembly 10 from the outside. Here, the outermost layer represents a layer disposed at the last when oriented in a direction opposite to the direction in which the electrode assembly 10 is disposed with respect to the moisture barrier layer 1352. The second polymer forming the surface protection layer 1353 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as polyethylene terephthalate (PET) having abrasion resistance and heat resistance may be used mainly. Also, the surface protection layer 1353 may have a single layer structure made of one material or a composite layer structure in which two or more materials are respectively formed as layers.

According to an embodiment of the present invention, the surface protection layer 1353 may have a thickness of 5 μm to 25 μm, in particular, 7 μm to 12 μm. If the thickness of the surface protection layer 1352 is less than 5 μm, external insulation may be deteriorated. Conversely, if the thickness of the surface protection layer 1352 is greater than 25 μm, the total thickness of the pouch may be thicker, and thus, the energy density relative to the volume of the secondary battery 1 may be reduced.

Although PET is inexpensive, has excellent durability, and has excellent electrical insulation, the PET has poor bonding force with respect to aluminum, which is frequently used for the moisture barrier layer 1352, and also, a behavior when the PET is drawn by applying stress may be different. Thus, when the surface protection layer 1353 and the moisture barrier layer 1352 are directly bonded to each other, the protection layer 1353 and the moisture barrier layer 1352 may be delaminated during the drawing molding. As a result, the moisture barrier layer 1352 is not uniformly drawn to cause the deterioration in moldability.

According to an embodiment of the present invention, the battery case 13 may be made of a third polymer and further include the drawing assistance layer 1354 that is stacked between the surface protection layer 1353 and the moisture barrier layer 1352. The drawing assistance layer 1354 may be stacked between the surface protection layer 1352 and the moisture barrier layer 1352 to prevent the surface protection layer 1353 and the moisture barrier layer 1352 from being delaminated when the surface protection layer 1352 and the moisture barrier layer 1352 are drawn. The third polymer forming the drawing assistance layer 1354 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, since a nylon resin easily adheres to polyethylene terephthalate (PET) of the surface protection layer 1352, and a behavior when being drawn is similar to that of an aluminum alloy of the moisture barrier layer 1352, the nylon resin may be mainly used. Also, the drawing assistance layer 1354 may have a single layer structure made of one material or a composite layer structure in which two or more materials are respectively formed as layers.

In the related art, the moisture barrier layer 1352 has a thickness of approximately 40 μm, and thus the drawing assistance layer 1354 had a significantly thin thickness of approximately 15 μm. That is, a thickness ratio of the drawing assistance layer and the moisture barrier layer is 1:2.67, and a thickness rate of the moisture barrier layer was considerably high. However, as described above, according to an embodiment of the present invention, since the moisture barrier layer 1352 has a thickness of approximately 50 μm to approximately 80 μm, and in particular, a thickness of 55 μm to 65 μm, the moldability of the moisture barrier layer 1352 is improved. Here, in order to also improve the moldability of the drawing assistance layer 1354, the drawing assistance layer 1354 may have a thickness of 20 μm to 50 μm, and in particular, a thickness of 25 μm to 38 μm. If the drawing assistance layer 1354 has a thickness less than 20 μm, the drawing assistance layer may not conform to the improved moldability of the moisture barrier layer and thus be damaged during the drawing. Conversely, if the sealant layer 1351 has a thickness greater than 50 μm, the total thickness of the pouch is thick to increase in volume of the secondary battery and deteriorate in energy density. Particularly, according to an embodiment of the present invention, a thickness ratio of the drawing assistance layer 1354 and the moisture barrier layer 1352 may be less than 1:2.5. That is, the thickness ratio of the drawing assistance layer 1354 may more increase when compared to the thickness ratio of the drawing assistance layer 1354 according to the related art. However, when the thickness of the drawing assistance layer 1354 is excessively thick, the total thickness of the pouch is thicker, and thus, the thickness ratio may be greater than 1:1.5 in order to prevent the total thickness of the pouch from be excessively thicker. That is, the thickness ratio may be 1:1.5 to 1:2.5.

FIG. 3 is a graph illustrating iron and silicon contents of an aluminum alloy having an alloy number AA8079 and an aluminum alloy having an alloy number AA8021.

As described above, the aluminum alloy thin film forming the moisture barrier layer 1352 may have a grain size of 10 μm to 13 μm, preferably 10.5 μm to 12.5 μm, more preferably 11 μm to 12 μm.

In addition, an iron (Fe) content in the aluminum alloy thin film may be 1.2 wt % to 1.7 wt %, preferably 1.3 wt % to 1.7 wt %, more preferably 1.3 wt % to 1.45 wt %. If the iron (Fe) content in the aluminum alloy thin film is less than 1.2 wt %, the strength of the aluminum alloy thin film may be deteriorated to generate the cracks and pinholes during the molding. If the iron (Fe) content exceeds 1.7 wt %, the flexibility of the aluminum alloy thin film is deteriorated to cause a limitation in improving of the moldability.

In addition, a silicon (Si) content in the aluminum alloy thin film may be 0.2 wt % or less, preferably 0.05 wt % to 0.2 wt %, more preferably 0.1 wt % to 0.2 wt %. When the silicon content exceeds 0.2 wt %, the moldability may be deteriorated.

Particularly, the aluminum alloy thin film according to the present invention may be an aluminum alloy having the alloy number AA8021.

On the other hand, the aluminum alloy thin film having the alloy number AA8079 was mainly used for the battery pouch according to the related art.

When the aluminum alloy contains a large amount of iron, mechanical strength is improved, and when the aluminum alloy contains a small amount of iron, flexibility is improved.

As illustrated in FIG. 3, the aluminum alloy having the alloy number AA8079 (hereinafter, referred to as an AA8079 aluminum alloy) contain 0.6 wt % to 1.2 wt % of iron, and 0.3 wt % or less of silicon. In the case of the aluminum alloy of alloy number AA8079, relatively little iron is included, and when the moisture barrier layer 1352 is manufactured using the same, the flexibility may be improved, but the strength may be deteriorated, and thus there may be a limitation in moldability.

On the other hand, as illustrated in FIG. 3, an AA8021 aluminum alloy may contain 1.2 wt % to 1.7 wt % of iron, and in particular, 1.3 wt % to 1.7 wt %, and 0.2 wt % or less of silicon. In the case of manufacturing the moisture barrier layer 1352 using the AA8021 aluminum alloy, since a relatively large amount of iron is contained, the tensile strength, the drawing rate, and the puncture strength may be improved.

On the other hand, when tensile force is applied to any material, a relationship between the tensile strength and the drawing rate may be expressed as a graph. Here, if a vertical axis of the graph is the tensile strength, and a horizontal axis is the drawing rate, a lower area of the graph is toughness of the corresponding material. The toughness refers to a degree of toughness against fracture of the material, and the more the toughness increases, the more the material is drawn until the material is not broken.

Thus, when the moisture barrier layer 1352 is manufactured using the AA8021 aluminum alloy, the tensile strength and the drawing rate may be improved, and thus, the toughness and the moldability may be improved.

FIG. 4 is a graph illustrating tensile strength, a drawing rate, and a grain size according to the iron and silicon contents of the AA8079 aluminum alloy and the AA8021 aluminum ally, and FIG. 5 is an enlarged SEM image illustrating the crystal grains of the AA8079 aluminum alloy and the AA8021 aluminum ally.

As illustrated in FIG. 4, the tensile strength, the drawing rate, and the grain size are changed according to the iron content of the aluminum alloy. Particularly, since the tensile strength and the drawing rate are proportional to the iron content, the tensile strength and the drawing rate also increase as the iron content increases. On the other hand, since the grain size is inversely proportional to the iron content, the grain size decreases as the iron content increases.

The AA8079 aluminum alloy has a relatively large grain size of 13 μm to 21 μm. Thus, there is a problem in that since internal stress is less dispersed when being drawn, the number of pinholes increases and the moldability of the battery case 13 is deteriorated.

The AA8021 aluminum alloy has a relatively small grain size of 10 μm to 13 μm. Thus, since the internal stress is more dispersed when being drawn, the number of pinholes may decrease to improve the moldability of the battery case 13.

The pouch film 135 according to the present invention may have a total thickness of 160 μm to 200 μm, preferably 180 μm to 200 μm. When the thickness of the pouch film 135 satisfies the above range, the molding depth may increase while minimizing the reduction of the battery accommodation space and the deterioration of the sealing durability due to the increase in thickness of the pouch.

The pouch film 135 according to the present invention has excellent tensile strength and drawing rate when the aluminum alloy thin film has the above-described specific thickness and grain size. Particularly, pouch film 135 may be cut to a size of 15 mm×80 mm, the tensile strength measured while being pulled at a tensile speed of 50 mm/min may be 200 N/15 mm to 300 N/15 mm, preferably 210 N/15 mm to 270 N/15 mm, more preferably 220 N/15 mm to 250 N/15 mm, and the drawing rate may be 120% to 150%, preferably 120% to 140%, more preferably 120% to 130%. As described above, the pouch film stack according to the present invention has the high tensile strength and drawing rate to increase in toughness. As a result, when the cup is molded, the possibility of generating cracks is low even though the molding depth is deep.

In addition, the pouch film stack according to the present invention has excellent puncture strength by including the aluminum alloy thin film having the specific thickness and grain size described herein. Particularly, the pouch film stack according to the present invention may have puncture strength of 30 N or more. FIG. 6 is an enlarged schematic view of a die edge 138 and an electrode tab 11 according to Comparative Example of the present invention.

A cup part 133 includes various types of edges, for example, includes a punch edge 139 formed to correspond to a pressing edge 221 of a punch 22 and a die edge 138 formed to correspond to a pressing edge 213 of a die 21. The punch edge 139 connects the bottom part 1332 of cup part 133 to each of a plurality of the walls 1333 defining a periphery of the cup part 133 and surrounding the bottom part 1332, and the die edge 138 connects each of the plurality of walls 1333 to a side 134. However, if the pressing edge of the die is not rounded, for example, if the pressing edge of the die is sharp when the pouch film 135 is formed, stress may be concentrated on the die edge of the cup part which can easily cause cracks.

To solve this problem, as illustrated in FIG. 6, the pressing edge 213 of the die 21 may be rounded so that the die edge 338 of the cup part 333 may be formed to be rounded to disperse the stress concentrated into the die edge somewhat.

However, when the depth of the cup part is formed to be greater than or equal to a certain depth, cracks may still occur in the pouch film 135 when the curvature radius of the die edge of the cup part is small (e.g., 2 mm or less). For example, the specific depth may be approximately 7 mm when molded with one cup part 133 and approximately 6.5 mm when molded with two cup parts 133.

In the present disclosure, the die edges 138 and 338 being rounded means that the die edges have a curved surface, and the curved surface may have a constant curvature on the whole, but is not limited thereto.

Thus, according to an embodiment of the present invention, the sealant layer 1351 may have a thickness of 60 μm to 100 μm, particularly 75 μm to 85 μm, and the moisture barrier layer 1352 may have a thickness of 50 μm to 80 μm, particularly 55 μm to 65 μm. The moisture barrier layer 1352 may be made of an aluminum alloy thin film having a grain size of 10 μm to 13 μm.

Thus, since the moldability of the moisture barrier layer 1352 is improved, as illustrated in FIG. 6, when the pouch film 135 is drawing-molded and the cup part 333 is formed to have a depth greater than or equal to a specific depth, the wall 3333 of the cup part 333 may be close to the vertical state, and a curvature radius R3 of each of the edges 338 and 339 of the cup part 333 may be reduced.

Alternatively, according to another embodiment of the present invention, when the pouch film 135 is drawing-molded, the cup part 333 may be formed to have a depth less than or equal to the specific depth so that the wall 3333 of the cup part 333 is close to the vertical state, and the curvature radius R3 of each of the edges 338 and 339 of the cup part 333 is reduced.

Particularly, the wall 3333 of the cup part 333 may be formed to be close to the vertical side so as to have an inclination angle of 90° to 95°, preferably 90° to 93° from the bottom part 3332. In addition, at least one of the edges 338 and 339 of the cup part 133 may be rounded to have a curvature radius that corresponds to 1/20 to 1/6 of the depth of the cup part 333. Particularly, even if at least one of the edges 338 and 339 of the cup part 133 is rounded to have the curvature radius R3 of 1 mm or less, particularly 0.7 mm or less, the cracks may be prevented from occurring.

As the battery case 13 is manufactured as described above, because the accommodation space 1331 has an increased volume, the electrode assembly 10 accommodated in the accommodation space 1331 may also be larger in volume, and in turn, increasing the energy efficiency of the secondary battery 1. In addition, the manufacturing costs may not increase significantly, the total thickness of the pouch may not increase significantly without reducing the thickness of the sealant layer 1351, and the sealing durability may not be deteriorated. Furthermore, since each of the pouch type battery case 13 and the pouch type secondary battery 1 have a sharp shape on the whole, an outer appearance of the secondary battery 1 may be excellent, and marketability may be improved.

However, as the wall 3333 of the cup part 333 is close to the vertical state, and the curvature radius of each of the edges 338 and 339 of the cup part 333 decreases, as illustrated in FIG. 6, the die edge 338 and the electrode tab (11) may interfere with each other. Particularly, since the electrode tab 11 protrudes from the electrodes stacked in the electrode assembly 10, and the electrode tab 11 may be provided in plurality per the number of electrodes in the electrode assembly 10. In addition, after the plurality of electrode tabs 11 are stacked and connected to each other, the electrode tabs 11 are seated on the side 134. Here, the electrode tabs 11 are seated from the die edge 338 to the side 134. Thus, as the curvature radius R3 of the die edge 338 decreases, the die edge 338 may be inserted toward the inside of the cup part 333, and also, flexibility at the die edge 338 may be deteriorated. Then, a distance between the die edge 338 and the electrode tabs 11 may be further reduced, and the die edge 338 may press the electrode tab 11 to cause the interference between the die edge 338 and the electrode tab 11. Particularly, as the number of electrode tabs 11 increases, the thickness of the stacked electrode tabs 11 increases, and thus, a space between the wall 3333 of the cup part 333 and the electrode tab 11 is narrowed. As the die edge 338 further presses the electrode tab 11, power may not be supplied smoothly, and the electrode tab 11 may be disconnected.

FIG. 7 is a partial plan view of the battery case 13 according to an embodiment of the present invention, and FIG. 8 is a partial plan view illustrating a state in which the electrode assembly 10 is inserted into the cup part 133 of the battery case 13 according to an embodiment of the present invention.

According to embodiments of the present invention, the moldability of the pouch film 135 may be improved. Thus, even though the wall 1333 of the cup part 133 is close to the vertical state, and the curvature radii R1 and R2 of the die edge 138 of the cup part 133 is reduced, the edge 138 and the electrode tab 11 may be prevented from interfering with each other.

The pouch type battery case 13 according to an embodiment of the present invention includes a cup part 133 accommodating an electrode assembly 10 formed by stacking electrodes and separators and a plurality of die edges 138 connecting a wall 1333 of the cup part 133 to a side 134 extending from the wall 1333. At least one die edge 138 includes a first area 1381 formed to be rounded with a first curvature radius R1 (see FIG. 9) and a second area 1382 formed to be rounded with a second curvature radius R2 (see FIG. 10) that is less than the first curvature radius R1.

In addition, the pouch type battery case 1 according to an embodiment of the present invention includes an electrode assembly 10 formed by stacking electrodes and separators and a battery case 13 including a cup part 133 accommodating the electrode assembly 10 therein. The battery case 13 includes a plurality of die edges 138 connecting a wall 1333 of the cup part 133 to a side 134 extending from the wall 1333. At least one die edge 138 includes a first area 1381 formed to be rounded with a first curvature radius R1 and a second area 1382 formed to be rounded with a second curvature radius R2 that is less than the first curvature radius R1.

As described above, the battery case 13 includes the plurality of walls 1333 surrounding a periphery of the cup part 133 and the side 134 extending from the wall 1333. In addition, the die edge 138 connects each of the plurality of walls 1333 to the side 134. According to an embodiment of the present invention, at least one die edge 138 is formed to be rounded with two different curvature radii R1 and R2. That is, as illustrated in FIG. 7, at least one die edge 138 includes the first area 1381 formed to be rounded with the first curvature radius R1 and the second area 1382 formed to be rounded with the second curvature radius R2 less than the first curvature radius R1.

Here, the first curvature radius R1 may be 1.7 mm to 2.7 mm, and the second curvature radius R2 may be 1.2 mm or less, preferably 0.7 mm or less. That is, the first curvature radius R1 may be greater 1.5 times to 4 times than the second curvature radius R2.

As illustrated in FIGS. 7 and 8, the first area 1381 is an area on which the electrode tab 11 protruding from one side of the electrode assembly 10 is seated. On the other hand, the second area 1382 is an area on which the electrode tab 11 is not seated. Thus, the first area 1381 is formed to be rounded with the relatively large first curvature radius R1, and the second area 1382 is formed to be rounded with the relatively small second curvature radius R2.

A length of the first area 1381 may correspond to a width of the electrode tab 11 so that the electrode tab 11 is securely seated. Here, the correspondence means that the length of the first area 1381 is equal to or slightly greater than the width of the electrode tab 11. If the length of the first area 1381 is less than the width of the electrode tab 11, the electrode tab 11 may not be seated with stability within the die edge 138.

Since the die edge 138 is formed along a circumference of the wall 1333 of the cup part 133, a plurality of die edges 138 may be formed at walls 1333. For example, as illustrated in FIG. 7, if the cup part 133 has a rectangular shape, four die edges 138 may be formed. However, the present invention is not limited thereto, and the number of die edges 138 may vary such that the number of die edges 138 is equal to the number of walls 1333 of the cup part 133.

In addition, if the plurality of electrode tabs 11 protrude in different directions of the electrode assembly 10, the first area 1381 on which the electrode tab 11 is seated may be formed on different die edge 138. For example, as illustrated in FIG. 7, one first area 1381 may be formed on each of two die edges 138 facing each other. Here, the first area 1381 may be disposed approximately at a center of the die edge 138, and the second area 1382 may be formed on each lateral side of the first area 1381. However, the present invention is not limited thereto, and if the plurality of electrode tabs 11 protrude in a side by side manner from one single side of the electrode assembly 10 in the same direction, the first area 1381 may be formed in plurality on one die edge 138. In this case, the second area 1382 may be formed between the plurality of first areas 1381.

Since the first area 1381 and the second area 1382 are rounded with different curvature radii R1 and R2, a stepped portion may be formed between the first area 1381 and the second area 1382.

However, the present invention is not limited thereto, and a connection area connecting the first area 1381 to the second area 1382 may be formed so that the stepped portion is not formed. The connection area may also be formed to be rounded and may be continuously changed from the first curvature radius R1 to the second curvature radius R2 while extending from the first area 1381 to the second area 1382. Thus, the first area 1381 and the second area 1382 may be continuously connected without forming the stepped portion therebetween.

FIG. 9 is an enlarged schematic view of the first area 1381 of the die edge 138 and the electrode tab 11 according to an embodiment of the present invention, and FIG. 10 is an enlarged schematic view of the second area 1382 of the die edge 138 of the cup part 133 and the electrode tab 11 according to an embodiment of the present invention.

As described above, the first area 1381 on which the electrode tab 11 is seated is rounded with the relatively large first curvature radius R1.

The first curvature radius R1 may be 1.7 mm to 2.7 mm. Therefore, as illustrated in FIG. 9, since the die edge 138 does not press the electrode tab 11, the die edge 138 and the electrode tab 11 may be prevented from interfering with each other on the first area 1381 on which the electrode tab 11 is seated.

On the other hand, the second area 1382 on which the electrode tab 11 is not seated is rounded with the relatively small second curvature radius R2. The second curvature radius R2 may be 1.2 mm or less, preferably 0.7 mm or less.

Therefore, as illustrated in FIG. 10, energy efficiency relative to the volume of the secondary battery 1 may also increase, and since each of the pouch type battery case 13 and the pouch type secondary battery 1 is manufactured with a sharp shape as a whole, the outer appearance of the secondary battery 1 may also be excellent, and the marketability may be improved.

FIG. 11 is a schematic view of a molding apparatus 2 according to an embodiment of the present invention.

The molding apparatus 2 for molding the pouch film 135 according to an embodiment of the present invention includes a die 21, having a top surface upon which a pouch film 135 may be seated. The top surface of the die defining at least one molding space 211 formed as recess extending inwardly from the top surface. The molding apparatus 2 also include a punch 22 disposed above the molding space 211 and arranged to punch, or insert, the pouch film 135 into the molding space 211 while descending to mold the pouch film 135. The die 21 includes a plurality of pressing edges 213 formed at the junction of the molding space 211 and the top surface, and at least one pressing edge 213 includes a third area 2131 (see FIG. 12) formed to be rounded with a third curvature radius and a fourth area 2132 (see FIG. 12) formed to be rounded with a fourth curvature radius that is less than the third curvature radius.

When molding the pouch film 135 using the molding apparatus 2, only one cup part 133 may be formed as described above, but the present invention is not limited thereto. For example, the two cup parts 133 may be drawing-molded to be adjacent to each other. For this, as illustrated in FIG. 6, two molding spaces 211 may be formed adjacent to each other in the die 21, and a partition wall 212 may be formed between the two molding spaces 211. When the pouch film 135 is drawing-molded while the punch 22 is inserted into both the molding spaces 211, one cup part may be formed in each of a first case 131 and a second case 132 to correspond to each of the two molding spaces 211, and thus, a total of two cup parts 133 may be formed. A bridge 136 may also be formed between the two cup parts 133 to correspond to the partition wall 212.

The bridge 136 may serve as a reference portion when the battery case 13 is subsequently folded. When the manufacture of the secondary battery 1 is completed, the bridge 136 may form a folding part (not shown) at one side of the secondary battery 1. Since the folding part integrally connects the first case 131 and the second case 132 to each other, the number of sides 134 to be sealed may be reduced when a sealing process is later performed. Thus, a process rate may be improved, and the number of sealing processes may be reduced. Here, as a width of the folding part decreases, a space between the wall 1333 of the cup part 133 and the electrode assembly 10 may also decrease. Thus, since the entire volume of the secondary battery 1 is reduced, the energy density relative to the volume may increase.

Since the width of the folding part is proportional to a thickness of the bridge 136, and the bridge 136 is formed to correspond to the partition wall 212, the thickness of the bridge 136 is proportional to the thickness of the partition wall 212. Therefore, when the pouch film 135 is molded, the thickness of the bridge 136 may be minimized, and for this reason, the thickness of the partition wall 212 may be minimized.

However, if the partition wall 212 is formed to have an excessively high height in a thin state, the partition wall 212 may be damaged in the drawing-molding process. Particularly, according to the related art, the die 21 has the bottom, but in this case, when the punch 22 molds the pouch film 135, a gas existing in the space between the pouch film 135 and the molding space 211 may not be discharged.

Therefore, recently, the bottom of the die 21 may be removed so that the gas existing in the space between the pouch film 135 and the molding space 211 is easily discharged, but the height of the partition wall 212 may be excessively high.

Therefore, according to an embodiment of the present invention, as illustrated in FIG. 11, an upper portion of the partition wall 212 may be maintained at a minimized thickness, and a reinforcing part 2121 that has a thickness greater than that of the partition wall 212 may be formed at a lower portion of the partition wall 212. The reinforcing part 2121 may be formed to be deeper than a depth D of the cup part 133 to be formed in the battery case 13 and may be formed at a position at which the partition wall 212 is not damaged. An exact position of the reinforcing part 2121 may be experimentally determined according to the thickness of the partition wall 212, a material of the partition wall 212, a pressure of the punch 22, and the depth D of the cup part 133 to be formed.

However, the present invention is not limited thereto, and the partition wall 212 may be formed to gradually increase in thickness from an upper portion toward the lower portion. That is, at least a portion of a cross-section of the partition wall 212 may have a substantially triangular shape, and an inner wall 214 of the molding space 211 formed in the partition wall 212 may have an inclination. The exact inclination of the inner wall 214 of the molding space 211 formed in the partition wall 212 may be experimentally determined by a thickness of an upper portion of the partition wall 212, the material of the partition wall 212, the pressure of the punch 22, and the depth of the cup part 133 to be formed. As a result, strength of the partition wall 212 may increase to prevent the partition wall 212 from being damaged in the drawing-molding process.

FIG. 12 is a partial enlarged view of the die 21 according to an embodiment of the present invention.

According to embodiments of the present invention, at least one die edge 138 of the pouch type battery case 13 includes the first area 1381 formed to be rounded with the first curvature radius R1 and the second area 1382 formed to be rounded with the second curvature radius R2 less than the first curvature radius R1.

In addition, in order to manufacture the battery case 13, the die 21 according to embodiments of the present invention includes the plurality of pressing edges 213 connecting the top surface thereof and the molding space 211 to each other, and at least one pressing edge 213 includes the third area 2131 that is rounded with the third curvature radius and the fourth area 2132 that is rounded with the fourth curvature radius that is less than the third curvature radius.

When the pouch film 135 is seated on the top surface of the die 21, over the molding space 211, with the punch 22 disposed above the molding space 211, the punch may descend to insert the pouch film 135 into the space 211 to mold the pouch film 135. As a result, the cup part 133 is formed, and the pouch type battery case 13 is manufactured. Here, the die edge 138 of the pouch type battery case 13 is formed to correspond to the plurality of pressing edges 213 of the die 21.

The third area 2131 of the pressing edge 213 corresponds to the first area 1381 of the battery case 13. Here, the third curvature radius of the third area 2131 may be a value obtained by subtracting the thickness of the pouch film 135 from the first curvature radius R1 of the first area 1381. For example, if the thickness of the pouch film 135 is 0.2 mm, the first curvature radius R1 of the first area 1381 may be 1.7 mm to 2.7 mm, and thus the third curvature radius of the third area 2131 may range of 1.5 mm and 2.5 mm.

In addition, the fourth area 2132 of the pressing edge 213 corresponds to the second area 1382 of the battery case 13. Here, the fourth curvature radius of the second area 2132 may be a value obtained by subtracting the thickness of the pouch film 135 from the second curvature radius R2 of the second area 1382. For example, the second curvature radius R2 of the second area 1382 may be 1.2 mm or less, preferably 0.7 mm or less, and the fourth curvature radius of the fourth area 2132 may be 1 mm or less, preferably may be 0.5 mm or less.

The pressing edge 213 of the die 21 corresponds to the die edge 138 of the battery case 13, and the molding space 211 of the die 21 corresponds to the cup part 133 of the battery case 13. Thus, since the pressing edge 213 is also formed along the circumference of the molding space 211, if the molding space 211 has a rectangular shape, four pressing edges 213 will be formed.

In addition, the third area 2131 may also be formed on different pressing edges 213. For example, one third area 2131 may be formed on each of two pressing edges 213 facing each other. Here, the third area 2131 may be disposed approximately at a center of the pressing edge 213, and the second area 2132 may be formed on each lateral sides of the first area 2131. However, the present invention is not limited thereto. For example, the third area 2131 may be formed in plurality on one die edge 138, and the fourth area 2132 may be formed between the third areas 2131.

Since the third area 2131 and the fourth area 2132 are rounded with different curvature radii, a stepped portion may be formed between the third area 2131 and the fourth area 2132. However, the present invention is not limited thereto, and a connection area connecting the third area 2131 to the fourth area 2132 may be formed so that the stepped portion is not formed. The connection area may also be formed to be rounded and may be tapered to continuously change from the third curvature radius to the fourth curvature radius while extending from the third area 2131 to the fourth area 2132. Thus, the third area 2131 and the fourth area 2132 may be connected without forming the stepped portion therebetween.

FIG. 13 is a partial perspective view of a secondary battery 1 according to another embodiment of the present invention.

At least one die edge 138 included in a battery case 13 according to this embodiment may correspond to an electrode tab 11 (see FIG. 1) and include a first area 1381 that is concavely recessed inward. The at least one die edge 138 may further include a second area 1382 connected to the first area 1381 and formed to be less concave inward than the first area 1381.

In more detail, when the secondary battery 1 is viewed from the outside, the first area 1381 may be more deeply recessed than the second area 1382, that is, toward a side 134. Thus, a protrusion or corner that interferes with the electrode tab 11 may not be formed in a width direction of the electrode tab 11, that is, in a length direction of the die edge 138.

That is, when the electrode assembly 10 is accommodated in the battery case 13, even though the electrode tab 11 does not exactly correspond to the first area 1381 and is partially deviated toward the second area 1382, the electrode tab 11 and the second area 1382 may not interfere with each other. For example, even though the first area 1381 has a length less than a width of the electrode tab 11, the electrode tab 11 and the second area 1382 may not interfere with each other.

Also, since the first area 1381 is concavely recessed, the electrode tab 11 may not be excessively pressed by the first area 1381.

Thus, even though the width of the electrode tab 11 of the electrode assembly 10 is changed, it is not necessary to change the molding apparatus.

Also, in this embodiment, the first area 1381 and the second area 1382 may be formed to be rounded with different curvature radii, respectively. That is, a first curvature radius R1 of the first area 1381 may be greater than a second curvature radius R2 of the second area 1382.

According to the embodiments of the present invention, there are at least the following effects.

In the die edge, the first area on which the electrode tab is seated may be formed to be rounded with a relatively large first curvature radius, and the second area on which the electrode tab is not seated may be formed to be rounded with a relatively small second curvature radius. Thus, even though the wall of the cup part is close to the vertical state, and the curvature radius of the die edge of the cup part is reduced, the interference between the die edge and the electrode tab may be prevented from occurring.

The effects of the present invention are not limited by the aforementioned description, and thus, more varied effects are involved in this specification.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch type battery case, comprising:
   a pouch film defining a first cup part including a bottom surface and a wall surrounding the bottom surface such that the first cup part is configured to accommodate an electrode assembly therein, the pouch film further including a side extending from the wall away from the first cup part and at least one die edge arranged at a junction of the side and the wall of the first cup part,
   wherein the at least one die edge includes a first rounded area defining a first curvature radius configured to seat an electrode tab and a second rounded area defining a second curvature radius less than the first curvature radius.

2. The pouch type battery case of claim 1, wherein the first curvature radius is between about 1.7 mm and about 2.7 mm.

3. The pouch type battery case of claim 1, wherein the second curvature radius is approximately equal to or less than 1.2 mm.

4. The pouch type battery case of claim 3, wherein the second curvature radius is approximately equal to or less than 0.7 mm.

5. The pouch type battery case of claim 4, wherein the pouch film is molded and comprises:
   a sealant layer made of a first polymer, the sealant layer formed at an innermost layer and with a thickness of between about 60 μm and about 100 μm;

a surface protection layer made of a second polymer, the surface protection layer formed at an outermost layer; and a moisture barrier layer provided between the surface protection layer and the sealant layer, wherein the moisture barrier layer comprises an aluminum alloy thin film having a thickness between about 50 μm and about 80 μm and a grain size between about 10 μm and about 13 μm.

6. The pouch type battery case of claim 1, wherein a depth of the first cup part measured from the bottom of the first cup to the side is about 7 mm.

7. The pouch type battery case of claim 6, further comprising a second cup part, wherein depths of the first and second cup parts are about 6.5 mm.

8. The pouch type battery case of claim 1, wherein the at least one die edge includes two die edges formed on opposite sides of the first cup part.

9. The pouch type battery case of claim 8, wherein each one of the two die edges comprises a single one of the first rounded areas.

10. The pouch type battery case of claim 9, wherein each one of the two die edges comprises two of the second rounded areas.

11. The pouch type battery case of claim 10, where the first rounded area is formed between the two second rounded areas on each respective die edge.

12. The pouch type battery case of claim 1, wherein the at least one die edge includes one die edge formed on one side of the first cup part, and the one die edge comprises a plurality of the first rounded areas and the second rounded area is formed between the plurality of the first rounded areas.

13. An apparatus for molding a battery case, comprising:
a die including a top surface on which a pouch film is configured to be seated, the top surface of the die defining at least one molding space recessed inwardly from the top surface, the die defining at least one pressing edge at a junction between the top surface and a wall of the at least one molding space; and a punch disposed above the molding space, the punch arranged to descend into the molding space to mold the pouch film, wherein the at least one pressing edge comprises:
a first rounded pressing area formed with a first radius of curvature, the first rounded pressing area being configured to mold the pouch film in an area that seats an electrode tab; and a second rounded pressing area formed with a second radius of curvature that is less than the first radius of curvature.

14. The apparatus of claim 13, wherein the first radius of curvature is between about 1.5 mm and about 2.5 mm.

15. The apparatus of claim 14, wherein the second radius of curvature is approximately equal to or less than 1 mm.

16. A pouch type secondary battery comprising:
an electrode assembly formed by stacking electrodes and separators; and a battery case comprising a pouch film defining a first cup part including a bottom surface and a wall surrounding the bottom surface for accommodating the electrode assembly therein, a side extending away from the wall of the first cup part, and a plurality of die edges, each of the plurality of die edges being arranged at a junction of the side and the wall of the first cup part, wherein at least one of the plurality of die edges comprises a first area defining a first inward concave recess upon which an electrode tab protruding from one side of the electrode assembly is seated, and a second area adjacent to the first area, the second area defining a second inward concave recess that is less concave than the first inward concave recess.

17. The pouch type secondary battery of claim 16, wherein the first area is rounded and defines a first radius of curvature, and the second area is rounded and defines a second radius of curvature that is less than the first radius of curvature.

18. The pouch type secondary battery of claim 16, wherein the electrode assembly has a surface area of between about 15,000 mm$^2$ and about 100,000 mm$^2$.

* * * * *